United States Patent
Matringe et al.

(10) Patent No.: US 9,945,703 B2
(45) Date of Patent: Apr. 17, 2018

(54) MULTI-TANK MATERIAL BALANCE MODEL

(71) Applicant: QRI GROUP, LLC, Houston, TX (US)

(72) Inventors: Sébastien François Matringe, Houston, TX (US); David Castiñeira Areas, Houston, TX (US); Amir Salehi, Stanford, CA (US)

(73) Assignee: QRI GROUP, LLC, Houston, TX (US)

( * ) Notice: Subject to any disclaimer, the term of this patent is extended or adjusted under 35 U.S.C. 154(b) by 484 days.

(21) Appl. No.: 14/604,367

(22) Filed: Jan. 23, 2015

(65) Prior Publication Data

US 2015/0346010 A1 Dec. 3, 2015

Related U.S. Application Data

(60) Provisional application No. 62/005,024, filed on May 30, 2014.

(51) Int. Cl.
| | |
|---|---|
| *G01F 11/00* | (2006.01) |
| *E21B 49/08* | (2006.01) |
| *G01F 1/36* | (2006.01) |
| *E21B 43/00* | (2006.01) |
| *G01F 15/06* | (2006.01) |

(52) U.S. Cl.
CPC .............. *G01F 1/36* (2013.01); *E21B 43/00* (2013.01); *G01F 15/063* (2013.01)

(58) Field of Classification Search
CPC ........... E21B 43/00; G01F 15/063; G01F 1/36
USPC .................. 702/6, 9, 12, 13, 45, 85, 50, 55; 166/250.15, 250.16, 252.1; 703/2, 10; 705/7.11, 7.28, 7.38
See application file for complete search history.

(56) References Cited

U.S. PATENT DOCUMENTS

| | | | |
|---|---|---|---|
| 3,035,440 | A | 5/1962 | Reed |
| 5,984,010 | A | 11/1999 | Elias et al. |
| 6,101,447 | A | 8/2000 | Poe |
| 7,079,952 | B2 | 7/2006 | Thomas et al. |
| 7,289,942 | B2 | 10/2007 | Yang et al. |
| 7,445,041 | B2 | 11/2008 | O'Brien |

(Continued)

OTHER PUBLICATIONS

Society of Petroleum Engineers, "Guidelines for the Evaluation of Petroleum Reserves and Resources"; SPE in associate with World Petroleum Congresses and American Association of Petroleum Geologists, 2001; pp. 1-139.

(Continued)

*Primary Examiner* — John H Le
(74) *Attorney, Agent, or Firm* — Workman Nydegger

(57) ABSTRACT

Embodiments are directed to performing material balance analysis for tanks in a petroleum reservoir and to performing dual porosity material balance analysis. In one scenario, a computer system divides a reservoir into multiple tank blocks, where at least two tank blocks are adjacent. The adjacent tanks are connected at a tank block boundary so that materials are permitted to travel between the tank blocks. The computer system determines flow rate between adjacent tank blocks proportional to the difference in tank block pressures. Then, upon making this determination, the computer system determines material balance for at least some of the tank blocks in the reservoir through influx and efflux of material across the tank block boundary. The material balance includes a determined material balance for one of the adjacent tank blocks and a determined material balance for the other adjacent tank block.

22 Claims, 6 Drawing Sheets

(56) References Cited

U.S. PATENT DOCUMENTS

| | | |
|---|---|---|
| 7,556,099 B2 | 7/2009 | Arthur et al. |
| 7,798,219 B1 | 9/2010 | Harnoy |
| 7,890,264 B2 | 2/2011 | Elphic |
| 7,963,327 B1 | 6/2011 | Saleri et al. |
| 8,145,427 B1 | 3/2012 | Saleri et al. |
| 8,145,428 B1 | 3/2012 | Saleri et al. |
| 8,195,401 B2 | 6/2012 | Ella et al. |
| 8,209,202 B2 | 6/2012 | Narayanan et al. |
| 8,880,422 B1 | 11/2014 | Lehmann et al. |
| 2001/0015133 A1 | 8/2001 | Sakai et al. |
| 2001/0037983 A1 | 11/2001 | Takahashi et al. |
| 2002/0013687 A1 | 1/2002 | Ortoleva |
| 2002/0120429 A1 | 8/2002 | Ortoleva |
| 2003/0225606 A1 | 12/2003 | Raghuraman et al. |
| 2004/0015376 A1 | 1/2004 | Zhu et al. |
| 2004/0158406 A1 | 8/2004 | Harrison |
| 2004/0220846 A1 | 11/2004 | Cullick |
| 2005/0038603 A1 | 2/2005 | Thomas et al. |
| 2005/0149307 A1 | 7/2005 | Gurpinar et al. |
| 2005/0209912 A1 | 9/2005 | Veeningen et al. |
| 2006/0224369 A1 | 10/2006 | Yang et al. |
| 2006/0289157 A1 | 12/2006 | Rao |
| 2007/0016389 A1 | 1/2007 | Ozgen |
| 2007/0028417 A1 | 2/2007 | Crichlow |
| 2007/0143025 A1 | 6/2007 | Valdez et al. |
| 2007/0284107 A1 | 12/2007 | Crichlow |
| 2008/0052097 A1 | 2/2008 | Bouzas et al. |
| 2008/0091283 A1 | 4/2008 | Balci et al. |
| 2008/0252898 A1 | 10/2008 | Pfaff |
| 2008/0262898 A1 | 10/2008 | Tonchev et al. |
| 2009/0005630 A1 | 1/2009 | Yokoyama et al. |
| 2009/0037115 A1 | 2/2009 | Magill et al. |
| 2009/0084545 A1 | 4/2009 | Banerjee et al. |
| 2009/0133871 A1 | 5/2009 | Skinner et al. |
| 2009/0313772 A1 | 12/2009 | Talley |
| 2010/0057418 A1 | 3/2010 | Li et al. |
| 2010/0082142 A1 | 4/2010 | Usadi et al. |
| 2010/0204972 A1 | 8/2010 | Hsu et al. |
| 2010/0300682 A1 | 12/2010 | Thakur et al. |
| 2011/0014088 A1 | 1/2011 | Zubrin et al. |
| 2011/0054869 A1 | 3/2011 | Li |
| 2011/0067443 A1 | 3/2011 | Martinez et al. |
| 2011/0168391 A1 | 7/2011 | Saleri et al. |
| 2011/0290479 A1 | 12/2011 | Izgec |
| 2012/0101759 A1 | 4/2012 | Rai et al. |
| 2012/0232865 A1 | 9/2012 | Maucec et al. |
| 2012/0292055 A1 | 11/2012 | Swist |
| 2013/0048279 A1 | 2/2013 | Appel et al. |
| 2013/0110474 A1 | 5/2013 | Saleri |
| 2013/0110524 A1 | 5/2013 | Saleri et al. |
| 2013/0110563 A1 | 5/2013 | Saleri |
| 2013/0110571 A1 | 5/2013 | Saleri et al. |
| 2013/0151159 A1 | 6/2013 | Pomerantz et al. |
| 2013/0161502 A1 | 6/2013 | Pomerantz et al. |
| 2013/0338987 A1 | 12/2013 | Cheng et al. |

OTHER PUBLICATIONS

U.S. Appl. No. 13/282,272, filed Oct. 26, 2011, Final Office Action dated Dec. 9, 2015.
U.S. Appl. No. 13/282,297, filed Oct. 26, 2011, Final Office Action dated Dec. 30, 2015.
U.S. Appl. No. 13/282,315, filed Oct. 26, 2011, Office Action dated Mar. 9, 2016.
Cordazzo et al., "Interblock Transmissibility Calculation Analysis for Petroleum Reservoir Simulation", Federal University of Santa Catarina, Nov. 2002, pp. 1-18.
Izgec et al, "Quantifying Reservoir Connectivity, In-Place Volumes, and Drainage-Area Pressures during Primary Depletion"; Elsevier, 2009; Journal of Petroleum Science and Engineering, vol. 69; p. 7-17.
Jolley et al., Reservoir Compartmentalization: An Introduction'; Reservoir Compartmentalization; The Geological Society of London, 2010; Special Publications vol. 347; pp. 1-8.
Kabir et al., "Diagnosis and Reservoir Compartmentalization from Measured Pressure/Rate Data during Primary Depletion"; Elsevier, 2009; Journal of Petroleum Science and Engineering, vol. 69, pp. 271-282.
McElroy, "Transient Pressure Analysis in Strip Reservoirs with Linear Skin Discontinuities", Stanford University, 1986, p. 1-58.
Smalley et al., "Reservoir Compartmentalization Assessed with Fluid Compositional Data", Society of Petroleum Engineers, Aug. 1994; SPE Reservoir Engineering, vol, 9 Is. 3; p. 175-180.
Yin "Geomechanics—Reservoir Modeling by Displacement Discontinuity—Finite Element Method" University of Waterloo, 2008, p. 1-141.
U.S. Appl. No. 13/282,272, filed Oct. 26, 2011, Office Action dated May 19, 2016.
U.S. Appl. No. 13/282,272, filed Oct. 26, 2011, Final Office Action dated Aug. 23, 2016.
U.S. Appl. No. 14/604,330, filed Jan. 23, 2015, Matringe et al.
Batavia, "Front-End Loading for Life Cycle Success", Offshore Technology Conference Paper No. OTC-12980; Published Apr. 2001.
BDM-Oklahoma, Inc., "Feasability Study of Heavy Oil Recovery in the United States", U.S. Department of Energy, Document No. NIPER/BDM-0225; Published Mar. 1995.
Burns et al., "Gas Field Development: Automatic Selection of Locations for New Producing Wells", Society of Petroleum Engineers, Document No. SPE-2429; Published 1969.
Fiksel et al., "Measuring Progress Towards Sustainability Principles, Process, and Best Practices", 1999 Greening of Industry Network Conference Best Practice Proceedings.
Freudenrich, Ph.D., Craig, and Jonathan Strickland, "How Oil Drilling Works" Apr. 12, 2001. HowStuffWorks.com retrieved from WayBack Machine, http://web.archive.org/web/20060418040616/http://science.howstuffworks.com/oil-drilling.htm/printable.
Graf et al., "Candidate Selection Using Stochastic Reasoning Driven by Surrogate Reservoir Models"; Society of Petroleum Engineers, Document No. SPE-136373; SPE Reservoir Evaluation and Engineering; Published Aug. 2011; p. 433-442.
Helman, "The Octopus", Forbes Energy & Genius, pp. 454-451, Nov. 24, 2008.
Investopedia.com, "What are leading, lagging, and coincident indicators? What are they for?", http://www.investopedia.com/ask/answers/177.asp, retrieved on Feb. 27, 2012.
Investorwords.com, "lagging indiciator", "leading indicator", http://www.investorwords.com/2713/lagging_indicator.html, http://www.investorwords.com/2741/leading_indicator.html.
"The Report of the BP U.S. Refiners Independent Safety Review Panel", Jan. 2007.
Saleri et al., "Data and Data Hierarchy", SPE 21369, pp. 1286-1293, Dec. 1992.
Saleri, "Dawn in the Desert: Saudi High Tech Paying Off at Ghawar", Energy Tribune, pp. 15-17, Sep. 2007.
Saleri et al., "Engineering Control in Reservoir Simulation: Parts I and II", SPE 18305, 1988.
Saleri et al., "The Expanding Role of the Drill Bit in Shaping the Subsurface", JPT, pp. 53-58, Dec. 2003.
Saleri, "Haradh III: A Milestone for Smart Fields", JPT, Nov. 2006.
Saleri, "'Learning' Reservoirs: Adapting to Disruptive Technologies", JPT, pp. 57-60, Mar. 2002.
Saleri, "The Next Trillion: Anticipating and Enabling Game-Changing Recoveries", JPT, Apr. 2006.
Saleri, "Reservoir Management Tenets: Why They Matter to Sustainable Supplies", JPT, pp. 28-30, Jan. 2005.
Saleri, "Reservoir Performance Forecasting: Acceleration by Parallel Planning", JPT, pp. 652-657, Jul. 1993.
Saleri et al., "Shaybah-220: A Maximum-Reservoir-Contact (MRC) Well and Its Implications for Developing Tight-Facies Reservoirs", SPE Reservoir Evaluation &.
Saleri, "Tenets and Diagnostics in Modern Reservoir Management", 8th International Forum on Reservoir Simulation, Jun. 2005, Stressa, Italy.
Schlumberger.com retrieved from WayBack Machine, http://web.archive.org/web/20071230014516/http://www.slb.com/.
Slide from 2003 Presentation by Joe Ault.

(56) References Cited

OTHER PUBLICATIONS

Society of Petroleum Engineers, "Petroleum Resources Management System"; SPE/World Petroleum Council; Published Apr. 2007.
U.S. Appl. No. 12/392,891, filed Feb. 25, 2009, Office Action dated Dec. 8, 2010.
U.S. Appl. No. 12/392,891, filed Feb. 25, 2009, Notice of Allowance dated Mar. 24, 2011.
U.S. Appl. No. 12/606,027, filed Oct. 26, 2009, Office Action dated Aug. 10, 2011.
U.S. Appl. No. 12/915,278, filed Oct. 29, 2010, Office Action dated Nov. 7, 2011.
U.S. Appl. No. 12/567,361, filed Sep. 25, 2009, Office Action dated Nov. 30, 2011.
U.S. Appl. No. 12/567,404, filed Sep. 29, 2009, Office Action dated Dec. 8, 2011.
U.S. Appl. No. 12/606,027, filed Oct. 26, 2009, Final Office Action dated Jan. 19, 2012.
U.S. Appl. No. 12/567,361, filed Sep. 25, 2009, Notice of Allowance dated Feb. 2, 2012.
U.S. Appl. No. 12/567,404, filed Sep. 25, 2009, Notice of Allowance dated Feb. 7, 2012.
U.S. Appl. No. 12/915,278, filed Oct. 29, 2010, Final Office Action dated Mar. 1, 2012.
U.S. Appl. No. 13/282,297, filed Oct. 26, 2011, Office Action dated Apr. 1, 2013.
U.S. Appl. No. 13/282,297, filed Oct. 26, 2011, Final Office Action dated Sep. 11, 2013.
U.S. Appl. No. 13/282,297, filed Oct. 26, 2011, Advisory Action dated Nov. 18, 2013.
U.S. Appl. No. 13/282,282, filed Oct. 26, 2011, Office Action dated Mar. 27, 2014.
U.S. Appl. No. 13/282,315, filed Oct. 26, 2011, Office Action dated Aug. 18, 2014.
U.S. Appl. No. 13/282,272, filed Oct. 26, 2011, Office Action dated Nov. 7, 2014.
U.S. Appl. No. 13/282,282, filed Oct. 26, 2011, Final Office Action dated Dec. 26, 2014.
U.S. Appl. No. 13/282,315, filed Oct. 26, 2011, Office Action dated Feb. 18, 2015.
U.S. Appl. No. 13/282,297, filed Oct. 26, 2011, Office Action dated Mar. 16, 2015.
Ham, Jerry, Ranking of Texas Reservoirs for Application of Carbon Dioxide Miscible Displacement, Apr. 1996.
Rivas et al., "Ranking Reservoirs for Carbon Dioxide Flooding Processes", 1994.
U.S. Appl. No. 13/282,282, filed Oct. 26, 2011, Office Action dated May 11, 2015.
U.S. Appl. No. 13/282,315, filed Oct. 26, 2011, Final Office Action dated Jun. 25, 2015.
U.S. Appl. No. 13/282,282, filed Oct. 26, 2011, Office Action dated Nov. 20, 2015.
U.S. Appl. No. 13/282,282, filed Oct. 26, 2011, Notice of References dated Nov. 30, 2015.
U.S. Appl. No. 14/836,564, filed Aug. 26, 2015, Mondal et al.

MULTI-TANK MATERIAL BALANCE MODEL

CROSS REFERENCE TO RELATED APPLICATION

This application claims the benefit of U.S. Prov. App. No. 62/005,024, filed May 30, 2014, and entitled "MULTI-TANK MATERIAL BALANCE MODEL," the disclosure of which is incorporated herein in its entirety.

BACKGROUND

Hydrocarbon reservoirs are exploited by drilling wells in a hydrocarbon bearing geologic formation. Both producing wells and injecting wells are typically used. The role of producing wells (producers) is to allow hydrocarbons to flow to the surface. Injecting wells (injectors) are drilled in order to maintain the reservoir pressure by injecting fluids (typically water or gas) to replace the produced fluids.

The key to a successful exploitation operation of a petroleum reservoir is to efficiently design and operate wells. In order to guide and optimize well operations, simulators are often used. The role of reservoir simulators is to forecast the production of wells in order to evaluate the possible outcomes of operational changes.

Reservoir simulators can be created in a variety of ways, but for the purpose of production optimization, it is desirable to take an approach that is both fast and accurate. The accuracy of the simulator is defined as the predictive power of the simulator: its ability to predict future well performance accurately and with a high level of confidence. The simulator's accuracy helps guarantee the economic success of the operational changes implemented. The speed of the simulator is defined as the time it takes to create or update a model and to perform a simulation. A fast simulator is desirable to update the model with new data in order to support daily operational decisions in a timely fashion.

The standard approach followed in the petroleum industry to model reservoirs is to use grid-based reservoir simulators. These simulators often rely on a finite volume discretization of the equations governing the motion of reservoir fluids. Alternate discretization methods, such as finite element methods, are also used from time to time. These methods all have in common that the primary unknowns solved during the computation are the fluid pressures of each fluid phase and the composition of each fluid component.

Classical grid-based reservoir simulation can be very accurate but is usually prohibitively slow. These models are large and require significant computer resources to run them. They are prohibitively slow for use in supporting day-to-day decisions related to production optimization. Grid-based reservoir simulation models are used primarily to support long-term field development decisions, such as the addition of new wells or changes to the exploitation strategy of the field.

Reservoir production can also be affected by material travel between reservoir tanks. To account for this travel of material, equations such as the general material balance equation (GMBE) may be used. The general material balance equation relies on the following assumptions: the reservoir follows an isothermal transformation and is at equilibrium at any point in time; the gas component can be in solution in the oil phase; the oil component can be volatile in the gas phase; and rock, water, and hydrocarbons are (slightly) compressible. While useful for general material balance determinations, the GMBE lacks the specificity to be applicable in specific multi-tank situations.

BRIEF SUMMARY

Embodiments described herein are directed to performing a material balance analysis for a plurality of tanks in a reservoir and to performing a dual porosity material balance analysis. In one embodiment, a computer system divides a reservoir into multiple different reservoir tank blocks, where at least two of the tank blocks are adjacent. The adjacent reservoir tanks are connected at a tank block boundary so that materials are permitted to travel between the reservoir tank blocks. The computer system determines a flow rate between the adjacent reservoir tank blocks proportional to the difference in tank block pressures. Then, upon making this determination, the computer system determines a material balance for at least some of the reservoir tank blocks in the reservoir through influx and efflux of material across the tank block boundary. The material balance includes a determined material balance for one of the adjacent reservoir tank blocks and a determined material balance for the other adjacent tank block.

In another embodiment, a computer system performs a dual porosity material balance analysis. The computer system divides a reservoir into tanks including a fracture tank and a matrix tank, where the fracture tank and the matrix tank have different physical properties. The fracture tank and the matrix tank also communicate material over a fracture-matrix tank boundary. The computer system determines a residual equation for the fracture tank by evaluating volume changes for phases within the fracture tank. Still further, the computer system selects a relative permeability for the fracture-matrix tank boundary and determines a residual equation for the matrix tank by evaluating volume changes for phases within the matrix tank. The computer system determines a Jacobian value for the fracture tank, determines a Jacobian value for the matrix tank and, using the determined residual equation for the fracture tank, the residual equation for the matrix tank, the Jacobian value for the fracture tank and the Jacobian value for the matrix tanks, determines a material balance for the reservoir.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
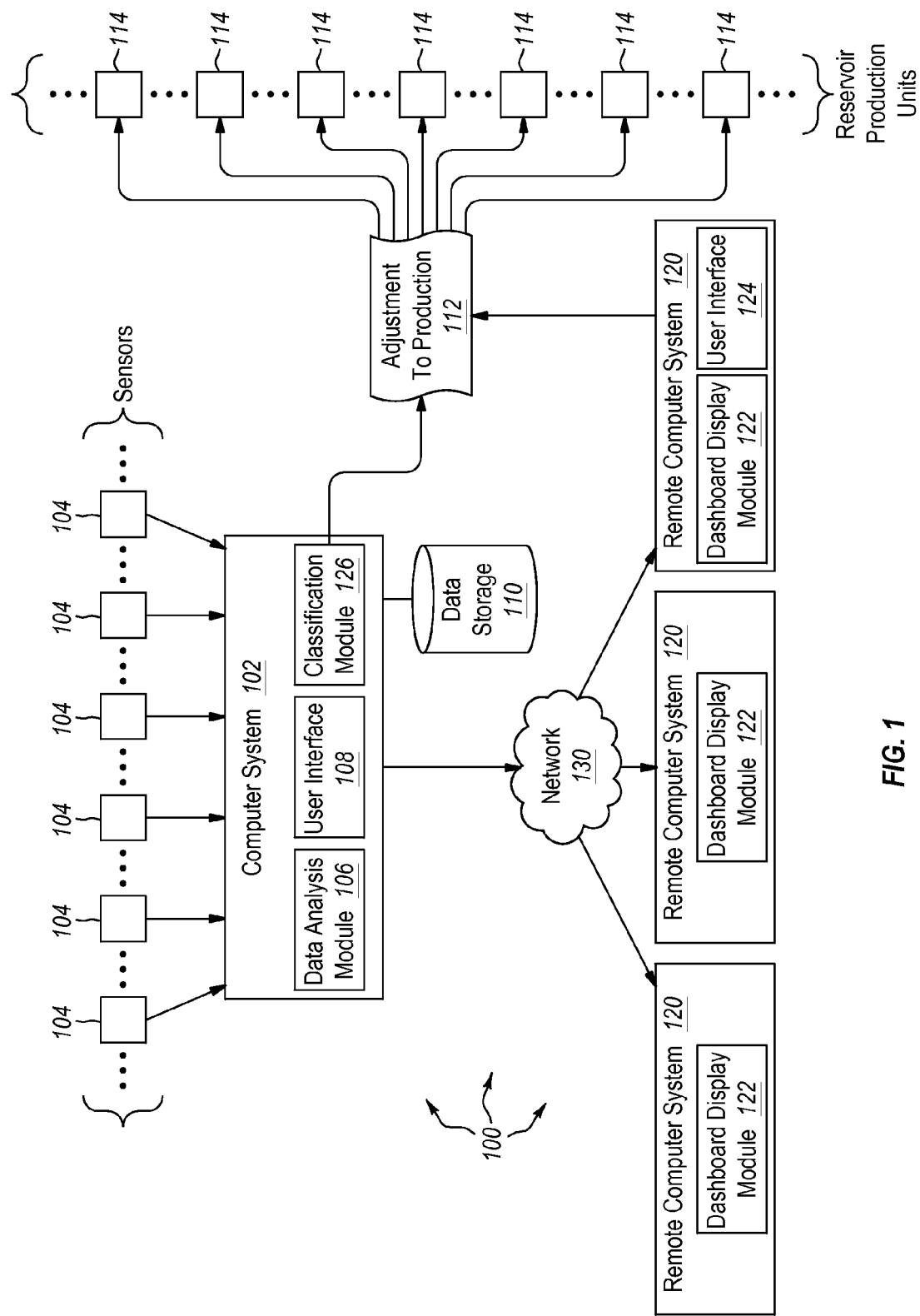
FIG. 1 illustrates a computer-implemented or computer-controlled architecture that can be used to gather, analyze and/or display data gathered from and about a reservoir.

Embodiments described herein are directed to performing a material balance analysis for tanks in a reservoir and to performing a dual porosity material balance analysis. In one embodiment, a computer system divides a reservoir into multiple different reservoir tank blocks, where at least two of the tank blocks are adjacent. The adjacent reservoir tanks are connected at a tank block boundary so that materials are permitted to travel between the reservoir tank blocks. The computer system determines a flow rate between the adjacent reservoir tank blocks proportional to the difference in tank block pressures. Then, upon making this determination, the computer system determines a material balance for at least some of the reservoir tank blocks in the reservoir through influx and efflux of material across the reservoir tank block boundary. The material balance includes a determined material balance for one of the adjacent reservoir tank blocks and a determined material balance for the other adjacent reservoir tank block.

In another embodiment, a computer system performs a dual porosity material balance analysis. The computer system divides a reservoir into tanks including a fracture tank and a matrix tank, where the fracture tank and the matrix tank have different physical properties but can be physically co-located. The fracture tank and the matrix tank also communicate material over a fracture-matrix tank boundary. The computer system determines a residual equation for the fracture tank by evaluating volume changes for phases within the fracture tank. Still further, the computer system selects a relative permeability for the fracture-matrix tank boundary and determines a residual equation for the matrix tank by evaluating volume changes for phases within the matrix tank. The computer system determines a Jacobian value for the fracture tank, determines a Jacobian value for the matrix tank and, using the determined residual equation for the fracture tank, the residual equation for the matrix tank, the Jacobian value for the fracture tank and the Jacobian value for the matrix tanks, determines a material balance for the reservoir.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computing architecture in which a computer-implemented monitoring system 100 may operate. The computer-implemented monitoring system 100 may be configured to monitor reservoir performance, analyze information regarding reservoir performance, display dashboard metrics, and optionally provide for computer-controlled modifications to maintain optimal oil well performance. Monitoring system 100 may include a main data gathering computer system 102 comprised of one or more computers (potentially located near a reservoir) which are linked to reservoir sensors 104. Each of these computers typically includes at least one processor and system memory. Computer system 102 may comprise a plurality of networked computers (e.g., each of which is designed to analyze a subset of the overall data generated by and received from the sensors 104).

Reservoir sensors 104 are typically positioned at different locations within a producing oil well, and may include both surface and sub-surface sensors. Sensors 104 may also be positioned at water injection wells, observation wells, etc. The data gathered by the sensors 104 can be used to generate performance metrics (e.g., leading and lagging indicators of production and recovery). The computer system 102 may therefore include a data analysis module 106 programmed to generate metrics from the received sensor data. A user interface 108 provides interactivity with a user, including the ability to input data relating to areal displacement efficiency, vertical displacement efficiency, and pore displacement efficiency. Data storage device 110 can be used for long term storage of data and metrics generated from the data.

According to one embodiment, the computer system 102 can provide for at least one of manual or automatic adjustment to production 112 by reservoir production units 114 (e.g., producing oil wells, water injection wells, gas injection wells, heat injectors, and the like, and sub-components thereof). Adjustments might include, for example changes in volume, pressure, temperature, well bore path (e.g., via closing or opening of well bore branches). The user interface 108 permits manual adjustments to production 112. The computer system 102 may, in addition, include alarm levels or triggers that, when certain conditions are met, provide for automatic adjustments to production 112.

Monitoring system 100 may also include one or more remote computers 120 that permit a user, team of users, or multiple parties to access information generated by main computer system 102. For example, each remote computer 120 may include a dashboard display module 122 that renders and displays dashboards, metrics, or other information relating to reservoir production. Each remote computer 120 may also include a user interface 124 that permits a user to make adjustment to production 112 by reservoir production units 114. Each remote computer 120 may also include a data storage device (not shown).

Individual computer systems within monitoring system 100 (e.g., main computer system 102 and remove computers 120) can be connected to a network 130, such as, for example, a local area network ("LAN"), a wide area network ("WAN"), or even the Internet. The various components can receive and send data to each other, as well as other components connected to the network. Networked computer systems (i.e. cloud computing systems) and computers themselves constitute a "computer system" for purposes of this disclosure.

Networks facilitating communication between computer systems and other electronic devices can utilize any of a wide range of (potentially interoperating) protocols including, but not limited to, the IEEE 802 suite of wireless protocols, Radio Frequency Identification ("RFID") protocols, ultrasound protocols, infrared protocols, cellular protocols, one-way and two-way wireless paging protocols, Global Positioning System ("GPS") protocols, wired and wireless broadband protocols, ultra-wideband "mesh" protocols, etc. Accordingly, computer systems and other devices can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Simple Object Access Protocol ("SOAP"), etc.) over the network.

Computer systems and electronic devices may be configured to utilize protocols that are appropriate based on corresponding computer system and electronic device on functionality. Components within the architecture can be configured to convert between various protocols to facilitate compatible communication. Computer systems and electronic devices may be configured with multiple protocols and use different protocols to implement different functionality. For example, a sensor 104 at an oil well might transmit data via wire connection, infrared or other wireless protocol to a receiver (not shown) interfaced with a computer, which can then forward the data via fast Ethernet to main computer system 102 for processing. Similarly, the reservoir production units 114 can be connected to main computer system 102 and/or remote computers 120 by wire connection or wireless protocol.

Figure 2:
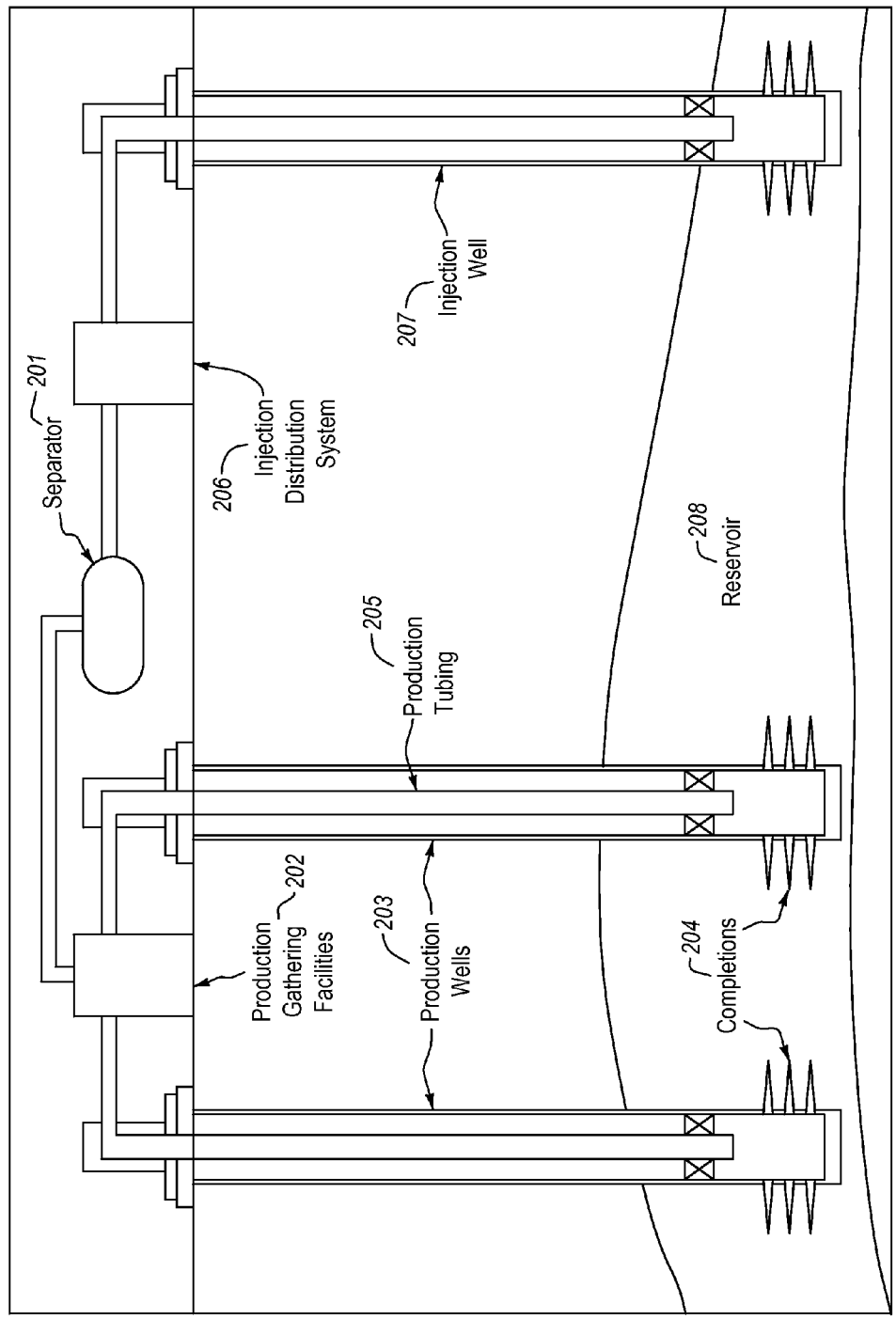
FIG. 2 illustrates an example schematic of a production and injection system of a petroleum field.

FIG. 2 illustrates a schematic of a production and injection system of a petroleum field. The production wells 203 allow reservoir fluids (from reservoir 208) to flow through their completion 204 and to the surface, where a network of pipelines (e.g. production tubing 205) carry the fluids to production gathering facilities 202, and in turn, to a separator 201. The separator system isolates each fluid phase (typically oil, gas and water). In some cases, the water or gas produced and separated are then sent to an injection distribution system 206. The injection distribution system can also receive injection fluids from exterior sources. The injection wells 207 receive the fluids to be injected from the injection distribution system 206 via a network of pipelines and inject these fluids in the petroleum reservoirs through well completions 204.

Figure 3:
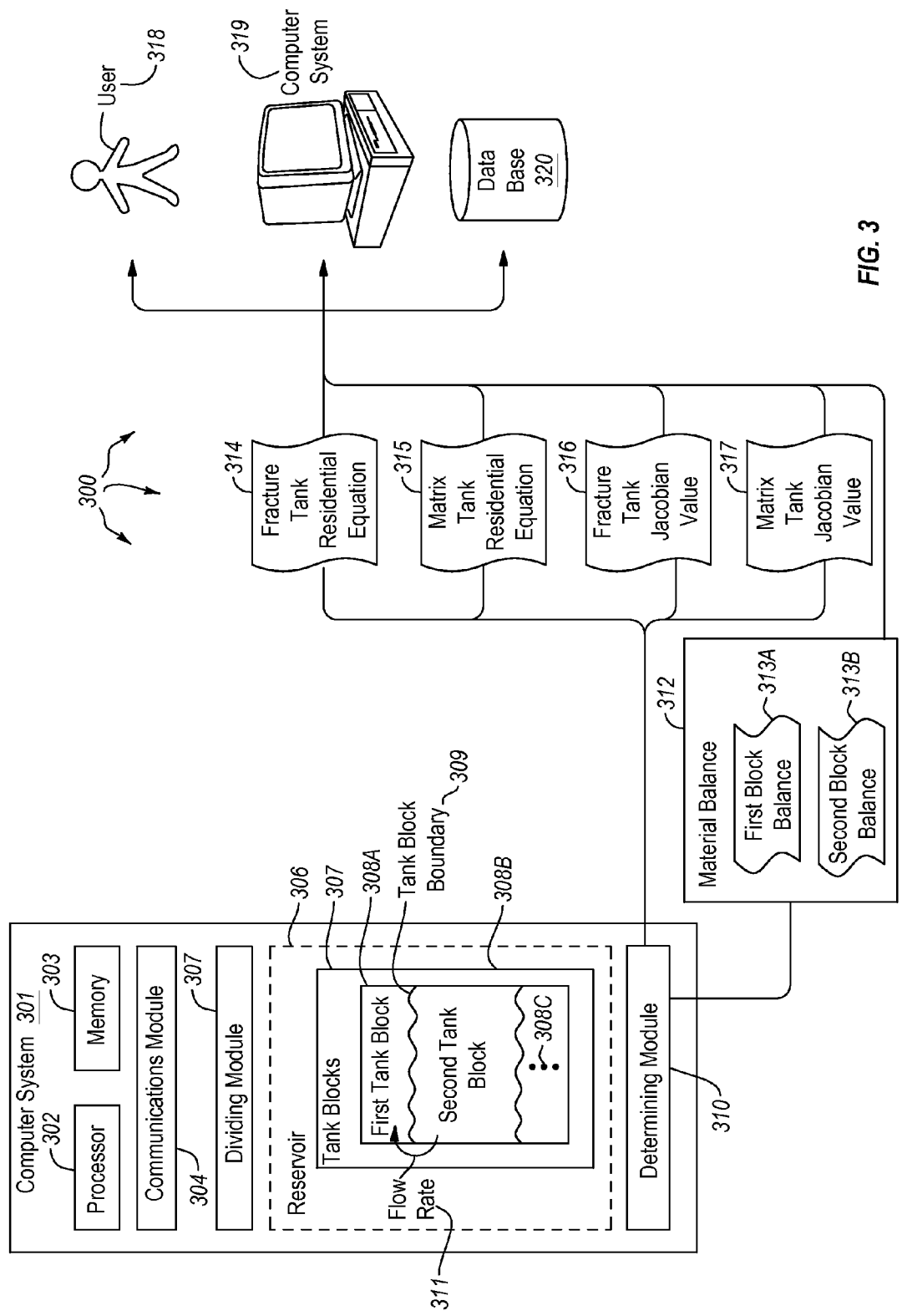
FIG. 3 illustrates a computer architecture in which embodiments described herein may operate including performing a material balance analysis for a plurality of tanks in a reservoir.

In some embodiments, reservoir fluid mixtures may be composed of two or more phases including oil, water or gas. The reservoirs themselves may be composed of multiple different reservoir tanks or reservoir tank blocks. These reservoir tank blocks may each have different physical properties. For example, the reservoir tank blocks may have formed in different manners geologically. The reservoir tanks may include different amounts of oil, gas, water or other materials. Still further, the reservoir tank blocks may be subject to different pressures owing to the different materials, different material amounts, or other forces such as the injection of fluids in adjacent or neighboring reservoir tanks. Accordingly, in such cases a computer system (e.g. 301 of FIG. 3) may be used to determine a material balance for the tanks in the reservoir.

Material balance analysis is a standard reservoir engineering tool for analysis of oil and gas reservoirs. One of the assumptions involved in the material balance analysis is that the reservoir behaves as a single reservoir tank, which implies there is little or no pressure variation within the reservoir. As such, rather than use a single reservoir tank, embodiments described herein are configured to subdivide the reservoir into a number of tanks or tank blocks that are allowed to communicate material between them. Such reservoir tanks can be either depleted directly by wells or indirectly through other reservoir tanks. Flow rate between reservoir tanks is determined proportionally to the difference in tank pressures. One example of a multi-tank reservoir is a faulted reservoir made up of different fault blocks separated by partially sealing faults. Each compartment is described by its own material balance, which is coupled to the material balance of neighboring compartments through influx of efflux of each phase that is present across the common boundaries. Application of the material balance method to compartmented reservoirs involves a fast, robust, and rigorous method for solving the system of coupled non-linear material balance equations.

From a storage capacity point of view, naturally fractured reservoirs (NFRs) can be classified into three groups. Reservoirs of type A, have high storage capacity in the matrix system and low storage capacity in the fractured system, reservoirs of type B, have about similar storage in matrix and fractures, and in reservoirs of type C, the storage capacity is exclusively in the fracture network. For reservoirs of type A and C, conventional material balance is applicable since the single-porosity model assumptions hold. However, there is a number of NFRs in which fractures not only assist permeability, but also contribute with storage capacity. For these reservoirs of type B, a new material balance is derived.

The "dual porosity material balance formulation", as the term is used herein, is a multi-tank material balance formulation with various modifications. In one embodiment, two reservoir tanks are considered (index 1 for fracture and index 2 for matrix) with different physical properties communicating through a transfer function. The two coupled non-linear equations (73) and (74) are to be solved simultaneously.

$$R_F(P_F, P_M) = 0, \quad (73)$$

$$R_M(P_F, P_M) = 0, \quad (74)$$

The following formulations (75) and (76) show the summarized tensorial notation:

$$\underline{R}(\underline{P}) = 0 \rightarrow \underline{\underline{J}} \, \delta p = -\underline{R}, \quad (75)$$

$$\underline{\underline{J}} = \frac{dR_i}{dP_j}, \quad \delta \underline{p} = \underline{p}^{k+1} - \underline{p}^k \quad (76)$$

The system may be linearized and the Jacobian for the coupled system of equations may be computed. The Jacobian format is shown in (77) below:

$$\begin{bmatrix} \frac{\partial R_F}{\partial P_F} & \frac{\partial R_F}{\partial P_M} \\ \frac{\partial R_M}{\partial P_F} & \frac{\partial R_M}{\partial P_M} \end{bmatrix} \begin{bmatrix} \delta P_F \\ \delta P_M \end{bmatrix} = -\begin{bmatrix} R_F \\ R_M \end{bmatrix}, \quad (77)$$

To obtain a residual equation for fracture, the change in volumes of each phase is first evaluated according to equations (78), (79), (80), and (81):

$$\Delta V_{g,F} = G_{fgi,F} B_{gi} - (G_{fgi,F} + N_{foi,F} R_{gi} - N_{fo,F} R_s - G_{p,F}) B_g - G_{inj,F} B_{ginj}, \quad (79)$$

$$\Delta V_{w,F} = -W_{e,F} + B_w W_{p,F} - B_{winj,F} W_{inj,F} - V_{\varphi i,F} S_{wi,F} c_w \Delta p, \quad (80)$$

$$\Delta V_{r,F} = -V_{\varphi i,F} c_{f,F} \Delta p, \quad (81)$$

$$\Delta V_{o,F} = N_{foi,F} B_{oi} - (N_{foi,F} + G_{fgi,F} R_{gi} - G_{fg,F} R_p - N_{p,F}) B_o, \quad (78)$$

The material balance equation is written out, first ignoring the transfer function between fracture and matrix as equation (82):

$$\Delta V_{o,F} + \Delta V_{g,F} + \Delta V_{w,F} + \Delta V_{r,F} = 0, \quad (82)$$

Combining equations (78)-(82) and rearranging terms, the following fracture residual equation (83) is obtained:

$$R_F = N_{foi,F} \left( \frac{B_o - B_{oi} + B_g(R_{si} - R_s) + R_v(B_{oi}R_s - B_o R_{si})}{1 - R_s R_v} \right) + \quad (83)$$

$$G_{fgi,F} \left( \frac{B_g - B_{gi} + B_o(R_{vi} - R_v) + R_s(B_{gi} R_v - B_g R_{vi})}{1 - R_s R_v} \right) -$$

$$N_{p,F} \left( \frac{B_o - R_s B_g}{1 - R_s R_v} \right) - G_{p,F} \left( \frac{B_g - R_v B_o}{1 - R_s R_v} \right) -$$

$$W_{p,F} B_w + W_{inj,F} B_{winj} + G_{inj,F} B_{ginf} +$$

$$(N_{foi,F} B_{oi} + G_{fgi,F} B_{gi}) \frac{(c_{f,F} + S_{wi,F} c_w)}{(1 - S_{wi,F})} \Delta p + W_{e,F} = 0,$$

To account for the multiphase transfer between matrix and fracture, the obtained fracture residual is modified according to (84) as:

$$R_F = R_F + \sum_{\alpha=o,w,g} \int_0^t \frac{CKV_b \sigma}{\overline{\mu}_\alpha^t} k_{r\alpha}(S^t)(P_{M,\alpha}^t - P_{F,\alpha}^t) dt, \quad (84)$$

In (84), the integrand denotes the rate of transfer of phase α from matrix to fracture. The discrete form of the integral in (84) is:

$$\sum_{\alpha=o,w,g} \int_0^t \frac{CKV_b \sigma}{\overline{\mu}_\alpha^t} k_{r\alpha}(S^t)(P_{M,\alpha}^t - P_{F,\alpha}^t) dt = \quad (85)$$

$$\sum_{\alpha=o,w,g} \sum_{k=1}^{n+1} \frac{CKV_b \sigma}{\overline{\mu}_\alpha^{k+1}} k_{r\alpha}(S^k)(p_{M,\alpha}^{k+1} - p_{F,\alpha}^{k+1}) \Delta t^k$$

In one formulation, the saturation is treated explicitly, whereas, the pressure is always treated implicitly. In other words, the simulator may function like an Implicit Pressure Explicit Saturation (IMPES) connection-based simulator with specific adaptation to the material balance formulation (e.g. direction dependent relative permeability functionality). The relative permeability functionality for a specific connection will be chosen from the upstream direction of connection. Moreover, the saturation feed to the functionality is the saturation of upstream block (see (86) and (87) below).

$$k_{r\alpha} = [\omega(k_{r\alpha})_M + (1 - \omega)(k_{r\alpha})_F], \quad (86)$$

$$\omega = \begin{cases} 1 & P_{M,\alpha} > P_{F,\alpha} \\ 0 & P_{F,\alpha} > P_{M,\alpha} \end{cases}, \quad C = 1.127 \times 10^{-3} \quad (87)$$

σ is the shape factor and is described by (88):

$$\sigma = const \left( \frac{1}{L_x^2} + \frac{1}{L_y^2} + \frac{1}{L_z^2} \right), \quad (88)$$

Table 3 below demonstrates the correlations of shape factor from different investigators available in the literature (with assumption of $L_x = L_y = L_z$).

TABLE 3

| Shape factor correlations for "const" | | | |
|---|---|---|---|
| SETS OF FRACTURE | 1 | 2 | 3 |
| WARREN & ROOT (1963) | 12 | 32 | 60 |
| KAZEMI ET AL (1975) | 4 | 8 | 12 |
| COATS (1989) | 8 | 16 | 24 |
| LIM & AZIZ (1995) | $\pi^2$ | $2\pi^2$ | $3\pi^2$ |

In order to derive the residual equation as generalized material balance for matrix block, the same procedure (equation (89) below) is followed as in the fracture network case (equation (83)):

$$R_M = N_{foi,M} \left( \frac{B_o - B_{oi} + B_g(R_{si} - R_s) + R_v(B_{oi}R_s - B_o R_{si})}{1 - R_s R_v} \right) + \quad (89)$$

$$G_{fgi,M} \left( \frac{B_g - B_{gi} + B_o(R_{vi} - R_v) + R_s(B_{gi} R_v - B_g R_{vi})}{1 - R_s R_v} \right) -$$

$$N_{p,M} \left( \frac{B_o - R_s B_g}{1 - R_s R_v} \right) - G_{p,M} \left( \frac{B_g - R_v B_o}{1 - R_s R_v} \right) -$$

$$W_{p,M} B_w + W_{inj,M} B_{winj} + G_{inj,M} B_{ginf} +$$

$$(N_{foi,M} B_{oi} + G_{fgi,M} B_{gi}) \frac{(c_{f,M} + S_{wi,M} c_w)}{(1 - S_{wi,M})} \Delta p + W_{e,M} = 0,$$

To account for the multiphase transfer between matrix and fracture, the obtained matrix residual is modified as follows in (90):

$$R_M = R_M - \sum_{\alpha=o,w,g} \int_0^t \frac{CKV_b \sigma}{\mu_\alpha^t} k_{r\alpha}(S^t)(P_{M,\alpha}^t - P_{F,\alpha}^t) dt, \quad (90)$$

Note that the transfer term in (90) is exactly the transfer term in (84), but with opposite sign.

To determine the fracture Jacobian, the terms related to fracture are derived in equation (77). $R_F$ is described by (84). Differentiation of the first term of residual is called $J_{norm,F}$, which is the basic part of Jacobian. The differentiation of the transfer term is as follows in (91) and (92):

$$\frac{\partial R_F}{\partial P_F} = J_{norm,F} + CKV_b \sigma k_{r\alpha}(S^n) \Delta t^{n+1} \quad (91)$$
$$\sum_{\alpha=o,w,g} \left[ \frac{-1}{\mu_\alpha^{n+1}} + (P_M^{n+1} - P_F^{n+1}) \frac{\partial}{\partial P_F^{n+1}} \left( \frac{1}{\mu_\alpha^{n+1}} \right) \right]$$

$$\frac{\partial R_F}{\partial P_M} = CKV_b \sigma k_{r\alpha}(S^n) \Delta t^{n+1} \quad (92)$$
$$\sum_{\alpha=o,w,g} \left[ \frac{+1}{\mu_\alpha^{n+1}} + (P_M^{n+1} - P_F^{n+1}) \frac{\partial}{\partial P_M^{n+1}} \left( \frac{1}{\mu_\alpha^{n+1}} \right) \right]$$

To determine the matrix Jacobian the terms related to matrix in equation (77) are derived. $R_M$ is described by (90). Differentiation of the first term of residual is called $J_{norm,M}$, which is the basic part of Jacobian and is derived previously in this report. Differentiation of the transfer term is as follows in (93) and (94):

$$\frac{\partial R_M}{\partial P_M} = J_{norm,M} + CKV_b \sigma k_{r\alpha}(S^n) \Delta t^{n+1} \quad (93)$$
$$\sum_{\alpha=o,w,g} \left[ \frac{+1}{\mu_\alpha^{n+1}} + (P_M^{n+1} - P_F^{n+1}) \frac{\partial}{\partial P_M^{n+1}} \left( \frac{1}{\mu_\alpha^{n+1}} \right) \right]$$

$$\frac{\partial R_M}{\partial P_F} = -CKV_b \sigma k_{r\alpha}(S^n) \Delta t^{n+1} \quad (94)$$
$$\sum_{\alpha=o,w,g} \left[ \frac{-1}{\mu_\alpha^{n+1}} + (P_M^{n+1} - P_F^{n+1}) \frac{\partial}{\partial P_F^{n+1}} \left( \frac{1}{\mu_\alpha^{n+1}} \right) \right]$$

In some embodiment, physically justified assumptions may be considered for purposes of testing. For instance, in some tests, an assumption may be made that no production of water, oil or gas is made from the matrix block:

$$N_{p,M} = G_{p,M} = W_{p,M} = W_{inj,M} = G_{inj,M} = 0$$

Most of the original oil in place is present in the matrix block:

$$N_{foi,F}(30\%), N_{foi,M}(70\%)$$

Aquifer feed is much greater for fracture than matrix:

$$W_{e,F} \gg W_{e,M}$$

Irreducible water saturation of fracture is negligible in comparison to matrix irreducible water saturation:

$$S_{wi,F} \gg S_{wi,M}$$

Rock compressibility in fracture is in the order of fluid compressibility and much larger than matrix block rock compressibility:

$$c_{f,F} \gg c_{f,M}$$

The computer system 301 may then normalize transmissibility values based on largest value, for example, and multiply the normalized vales by the $T_{gMAX}$ which may be specified by a user. At least in some embodiments, the user 318 may provide two sets of saturation functions (relative permeability) for fracture and matrix separately. A linear relative permeability curve is assumed for the multiphase flow inside fracture network. The user may provide this relative permeability data in a data file such as a spreadsheet. These concepts will be explained further below with regard to the computing architecture 300 of FIG. 3, along with methods 400 and 500 of FIGS. 4 and 5, respectively.

Figure 4:
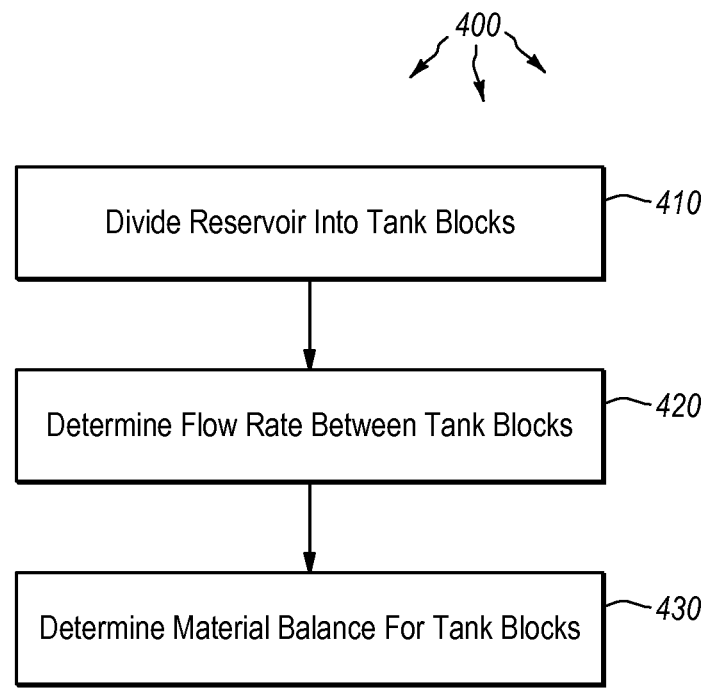
FIG. 4 illustrates a flowchart of an example method for performing a material balance analysis for a plurality of tanks in a reservoir.
Figure 5:
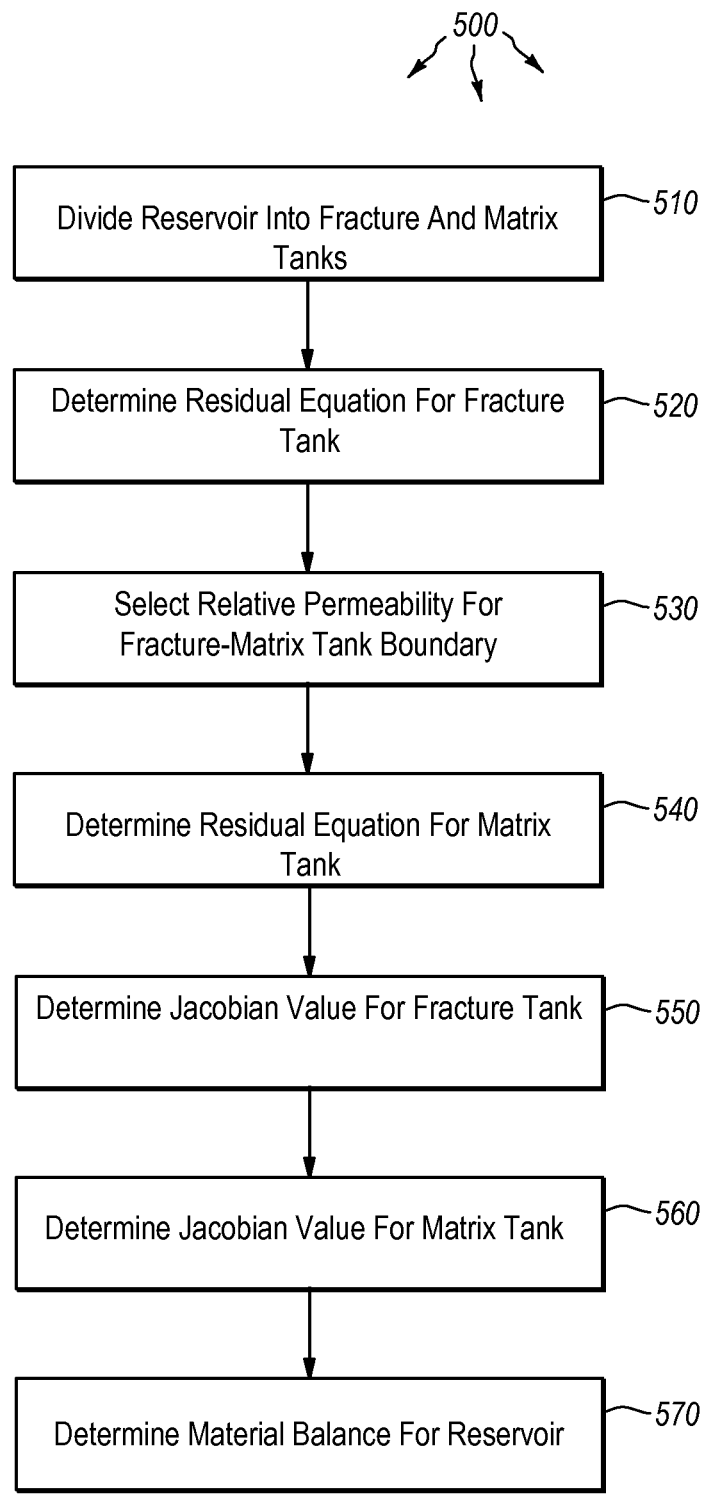
FIG. 5 illustrates a flowchart of an alternative example method for performing a dual porosity material balance analysis.

In view of the systems and architectures described above, methodologies that may be implemented in accordance with the disclosed subject matter will be better appreciated with reference to the flow charts of FIGS. 4 and 5. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 4 illustrates a flowchart of a method 400 for performing a material balance analysis for tanks in a reservoir. The method 400 will now be described with frequent reference to the components and data of environment 300.

Method 400 includes dividing a reservoir into a plurality of different tank blocks, at least a first and a second tank block of the plurality of reservoir tank blocks being adjacent so as to be connected at a reservoir tank block boundary such that materials are permitted to travel between the first and second tank blocks (410). For example, dividing module 305 of computer system 301 may divide reservoir 306 into multiple tank blocks 307. It will be understood that the reservoir 306 is a digital representation of a reservoir and that the various tank block divisions are digital representations of reservoir tank blocks. The reservoir 306 and reservoir tank blocks 307 thus correspond to actual, real-life reservoirs and reservoir tank blocks. The reservoir tank blocks are separated by boundaries such as tank block boundary 309. The reservoir tank block boundary 309 may thus form a boundary between the first reservoir tank block 308A and the second reservoir tank block 308B. (Other boundaries may exist between other reservoir tank blocks, as represented by ellipses 308C). The boundary may be permeable and may allow fluid/material flow between the reservoir tank blocks. This fluid/material may flow at a certain rate that may be determined by computer system 301.

Here, it will be understood that each of the modules of computer system 301 may interact with or be processed by processor 302 and/or memory 303. Moreover, communications with other computing systems or users may occur using the communications module 304. For instance, user 318 may interact with the computer system 301 using various inputs. Similarly, the computer system 301 may interact with other computer systems (e.g. 319) or databases (e.g. 320) using the communications module 304.

Method 400 further includes determining a flow rate between the first and second reservoir tank blocks proportional to the difference in reservoir tank block pressures (420). The determining module 310 of computer system 301 determines a flow rate 311 between first reservoir tank block 308A and the second reservoir tank block 308B proportional to the difference in reservoir tank block pressures. The determining module 310 then determines a material balance 312 for at least some of the plurality of reservoir tank blocks in the reservoir (430). The material balance includes a determined material balance 313A for the first reservoir tank block 308A and a determined material balance 313B for at least the second adjacent reservoir tank block 308B through influx and efflux of material across the reservoir tank block boundary 309.

In some cases, the reservoir tank blocks 308A and 308B are part of a reservoir that includes many different tank blocks (as represented by 308C). These reservoir tank blocks may be depleted directly by wells (as generally shown in FIG. 2), or may be depleted indirectly through material flow between other reservoir tank blocks. The material flow may flow at a different flow rate between different reservoir tank blocks, and may flow at a different rate over time. The flow rate may change over time due to pressure changes caused by wells in adjacent reservoir tank blocks, or may change due to natural causes such as earthquakes. Material balance between reservoir tanks may be determined for multiple different reservoir tanks according to a multi-tank material balance model. The multi-tank material balance model may be configured to perform a material balance analysis in a naturally-fractured reservoir or in other types of reservoirs.

A multi-tank material balance model is configured to identify and account for multi-phase inter-block communications of material. The materials may include oil, water, gas or other materials. Determining the material balance for the materials in at least some of the reservoir tank blocks in the reservoir may include determining a cumulative net influx minus net efflux for each phase (e.g. oil, water or gas). As will be understood, each reservoir tank block may be receiving material from other reservoir tank blocks and simultaneously be transferring material to other reservoir tank blocks. Thus, the material balance for the reservoir may track the net influx of material from other reservoir tank blocks minus the net efflux of material from surrounding reservoir tank blocks.

In some embodiments, the multi-tank material balance model may be configured to compute transmissibility values. These transmissibility values provide an indication of how easily fluid or other material is transmitted between reservoir tank blocks. The multi-tank material balance model may further be configured to calculate residual values for different reservoir tank blocks separated by faults (i.e. boundaries 309) with varying degrees of sealing (i.e. various levels of transmissibility) between reservoir tank blocks. These residual values may be used, in combination with other calculated values, to determine a multi-tank material balance. Still other values may be included in this determination including calculating a driving volume for some of the reservoir tank blocks. The driving volume for the reservoir tank blocks may be recorded in a driving index and may be used in the multi-tank material balance determination. Each driving factor may identify a proportional amount of force that the driving factor is having on a reservoir (e.g. rock & water connate expansion, oil & gas expansion, aquifer encroachment, water injection, gas injection and net influx).

The multi-tank material balance model may further be configured to calculate, for each time step, pressure, phase volumes for oil, water and gas (OWG), phase saturations (for OWG), driving index and connection information (e.g. inter-block phase flux and cumulative fluxes). Each portion of information may lead to a more accurate determination of material balance between reservoir tanks. The multi-tank material balance model may be configured to store geometric transmissibility data, relative permeability data, rate information and cumulative influx of OWG phases for multiple connections at various time steps. This data may be used immediately in the material balance determination, or may be stored for later reference and for subsequent determinations of material balance. Connections between blocks may be described by different sets of relative permeability functionality based on which of the connected reservoir tank blocks is an upstream block. The multi-tank material balance model thus provides an allowance for fractures in the reservoir. Such fractures may increase permeability and may contribute storage capacity to the reservoir. Accordingly, the presence of fractures, in addition to or as an alternative to the other factors and values described above, may be incorporated into the determination of material balance between reservoir tank blocks.

Turning now to FIG. 5, a method 500 is illustrated for performing a dual porosity material balance analysis. The method 500 will now be described with frequent reference to the components and data of environment 300.

Figure 6:
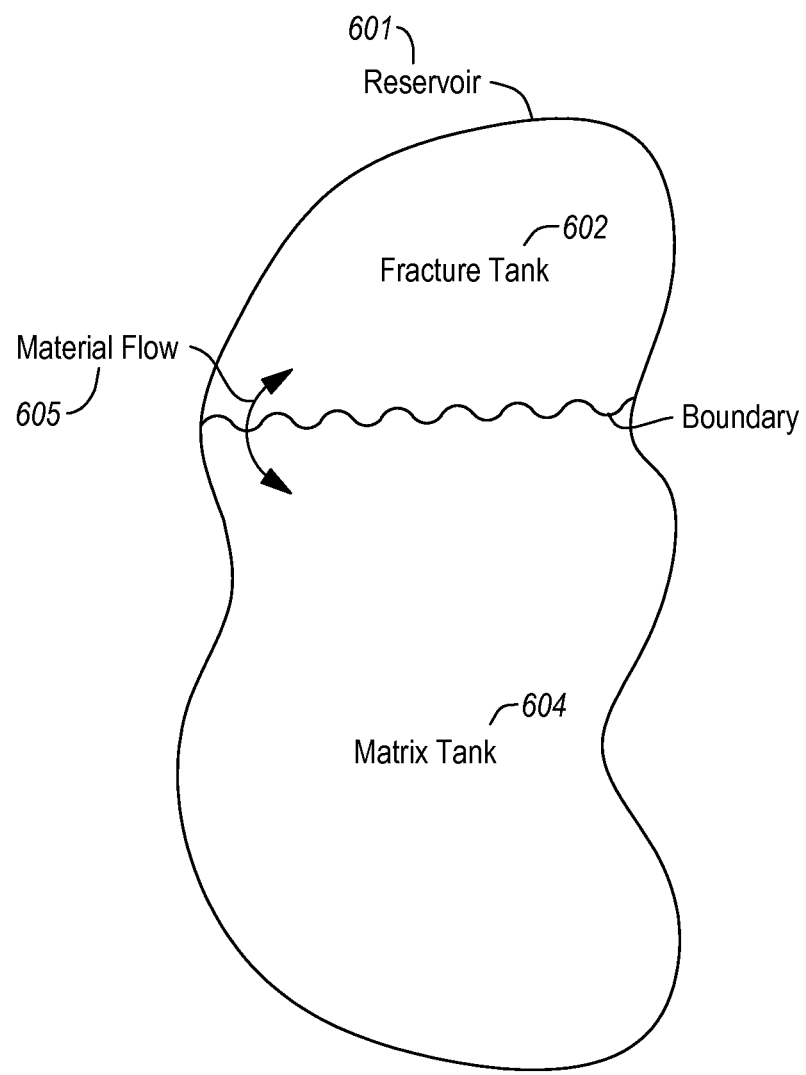
FIG. 6 illustrates an embodiment of reservoir that is divided into a fracture tank and a matrix tank.

Method 500 includes dividing a reservoir into tanks including at least a fracture tank and a matrix tank, the fracture tank and the matrix tank communicating one or more portions of material over a fracture-matrix tank boundary, the fracture tank and the matrix tank having one or more different physical properties (510). For example, the dividing module 305 of computer system 301 may divide reservoir 306 into various tanks including first reservoir tank block 308A and second reservoir tank block 308B. FIG. 6 shows an embodiment where a reservoir 601 is divided by boundary 603 into a fracture tank 602 and a matrix tank 604. At least in some embodiments, material is allowed to flow 605 between the boundary 603. The material may be able to flow to or from either the fracture tank or the matrix tank. These reservoir tanks will be referred to below in combination with the elements of FIG. 3.

Method 500 further includes determining a residual equation for the fracture tank by evaluating volume changes for one or more phases within the fracture tank (520). The determining module 310 of computer system 301 may determine residual equation 314 for the fracture tank 602 by evaluating volume changes for phases (e.g. OWG) within the fracture tank. The computer system 301 may then select a relative permeability for the fracture-matrix tank boundary 603 (530). The determining module 310 of computer system 301 may then determine a residual equation 315 for the matrix tank 604 by evaluating volume changes for phases (e.g. OWG) within the matrix tank (540). The computer system 301 may further determine a Jacobian value 316 for the fracture tank (550) and a Jacobian value 317 for the matrix tank (560). Then, using the determined residual equation 314 for the fracture tank, the residual equation 315 for the matrix tank, the Jacobian value 316 for the fracture tank and the Jacobian value 317 for the matrix tanks, the determining module 310 may determine a material balance for the reservoir 601 (570).

In some embodiments, each reservoir tank (e.g. 601 and 602) may have its own residual value or set of residual values. These residuals for the reservoir tanks may comprise a set of non-linear equations that are solved simultaneously. These non-linear equations may be solved simultaneously by constructing a Jacobian matrix to perform linearization. As such, the Jacobian values 316 and 317 may be determined for each reservoir tank. In some cases, residual values for a given reservoir tank may be modified so that the integrand denotes the rate of transfer of a phase a from the matrix tank 604 to the fracture tank 602. In other cases, the residual values for a given reservoir tank may be modified so that the integrand denotes the rate of transfer of a phase from the fracture tank 602 to the matrix tank 604 (resulting in the opposite of the above transfer term). Other methods of modifying the residual values may also be used. These values, along with the other calculated values and equations may thus be used to determine a material balance 312 between tanks in a reservoir.

Accordingly, methods, systems and computer program products are provided which perform a material balance analysis for tanks in a reservoir. Moreover, methods, systems and computer program products are provided which perform a dual porosity material balance analysis.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for performing a material balance analysis for a plurality of tanks in a petroleum reservoir according to a multi-tank material balance model, the method comprising:
    dividing a petroleum reservoir into a plurality of different tank blocks, at least a first tank block and a second tank block of the plurality of tank blocks being adjacent so as to be connected at a reservoir tank block boundary such that materials are permitted to travel between the first and second tank blocks;
    determining a flow rate between the first and second tank blocks proportional to the difference in reservoir tank block pressures;
    determining a material balance for at least some of the plurality of tank blocks in the reservoir, the material balance comprising a determined material balance for the first tank block and a determined material balance for at least the second adjacent tank block through influx and efflux of material across the reservoir tank block boundary; and
    based on the material balance, manually or automatically modifying operation of one or more production units at the petroleum reservoir selected from producing oil wells, water injection wells, gas injection wells, heat injectors, or sub-components thereof, wherein adjusting the operation of the one or more production units is selected from change in volume, change in pressure, change in temperature, and change in well bore path.

2. The method of claim 1, wherein the tank blocks are depleted directly by wells or indirectly through other reservoir tank blocks.

3. The method of claim 1, wherein the multi-tank material balance model identifies and accounts for multi-phase inter-block communications.

4. The method of claim 3, wherein the phases comprise at least one of oil, water or gas.

5. The method of claim 4, wherein determining the material balance for at least some of the plurality of tank blocks in the reservoir comprises determining a cumulative net influx minus net efflux for each phase.

6. The method of claim 1, wherein the multi-tank material balance model is configured to compute transmissibility.

7. The method of claim 1, wherein the multi-tank material balance model is configured to calculate one or more residuals for different reservoir tank blocks separated by faults with varying degrees of sealing between tank blocks.

8. The method of claim 1, further comprising calculating a driving volume for at least some of the plurality of tank blocks.

9. The method of claim 8, wherein the calculated driving volume for the tank blocks is recorded in a driving index.

10. The method of claim 1, wherein the multi-tank material balance model is configured to calculate, for each time step, one or more of the following: pressure, phase volumes (OWG), phase saturations (OWG), driving index, and connection information.

11. The method of claim 10, wherein the multi-tank material balance model is configured to store geometric transmissibility data, relative permeability data, rate information and cumulative influx of one or more phases for one or more connections at one or more time steps.

12. The method of claim 11, wherein the connections are described by at least two separate sets of relative permeability functionality based on which of the connected tank blocks is an upstream blocks.

13. The method of claim 1, wherein the multi-tank material balance model is configured to perform a material balance analysis in a naturally-fractured petroleum reservoir.

14. At a computer system including at least one processor, a computer-implemented method for performing a dual porosity material balance analysis for a petroleum reservoir, the method comprising:
    dividing a petroleum reservoir into reservoir tanks including at least a fracture tank and a matrix tank, the fracture tank and the matrix tank communicating one or more portions of material over a fracture-matrix tank boundary, the fracture tank and the matrix tank having one or more different physical properties;
    determining a residual equation for the fracture tank by evaluating volume changes for one or more phases within the fracture tank;
    selecting a relative permeability for the fracture-matrix tank boundary;
    determining a residual equation for the matrix tank by evaluating volume changes for one or more phases within the matrix tank;
    determining a Jacobian value for the fracture tank;
    determining a Jacobian value for the matrix tank;
    using the determined residual equation for the fracture tank, the residual equation for the matrix tank, the Jacobian value for the fracture tank and the Jacobian value for the matrix tanks, determining a material balance for the petroleum reservoir; and
    based on the material balance, manually or automatically modifying operation of one or more production units at the petroleum reservoir selected from producing oil wells, water injection wells, gas injection wells, heat injectors, or sub-components thereof, wherein adjusting the operation of the one or more production units is selected from change in volume, change in pressure, change in temperature, and change in well bore path.

15. The method of claim 14, wherein each reservoir tank has its own residual value, and wherein a set of residuals for the reservoir tanks comprises a set of non-linear equations that are solved simultaneously.

16. The method of claim 15, wherein the set of non-linear equations is solved simultaneously by constructing a Jacobian matrix to perform linearization.

17. The method of claim 14, further comprising modifying a determined residual for a reservoir tank such that the integrand denotes the rate of transfer of a phase a from the matrix tank to the fracture tank.

18. The method of claim 14, further comprising modifying the determined matrix residual such that the integrand denotes the rate of transfer of a phase from the fracture tank to the matrix tank.

19. The method of claim 14, further comprising calculating a transmissibility measure between reservoir tank connections.

20. A computer system comprising the following:
one or more processors;
system memory;
one or more computer-readable storage media having stored thereon computer-executable instructions that, when executed by the one or more processors, cause the computing system to perform a method for performing a material balance analysis for a plurality of tanks in a petroleum reservoir according to a multi-tank material balance model, the method comprising:
dividing a petroleum reservoir into a plurality of different reservoir tank blocks, at least a first tank block and a second tank block of the plurality of reservoir tank blocks being adjacent so as to be connected at a reservoir tank block boundary such that materials are permitted to travel between the first and second tank blocks;
determining a flow rate between the first and second tank blocks proportional to the difference in reservoir tank block pressures;
determining a material balance for at least some of the plurality of reservoir tank blocks in the petroleum reservoir, the material balance comprising a determined material balance for the first tank block and a determined material balance for at least the second adjacent tank block through influx and efflux of material across the reservoir tank block boundary; and
based on the material balance, manually or automatically modifying operation of one or more production units at the petroleum reservoir selected from producing oil wells, water injection wells, gas injection wells, heat injectors, or sub-components thereof, wherein adjusting the operation of the one or more production units is selected from change in volume, change in pressure, change in temperature, and change in well bore path.

21. The computer system of claim 20, wherein determining the material balance for the plurality of reservoir tank blocks includes an allowance for fractures in the petroleum reservoir, the fractures increasing permeability and contributing storage capacity to the petroleum reservoir.

22. The computer system of claim 20, wherein determining the material balance for at least some of the plurality of reservoir tank blocks in the reservoir comprises determining a cumulative net influx minus net efflux for each phase, the phases including at least one of oil, water or gas.

* * * * *